United States Patent
Ito

(10) Patent No.: US 8,363,250 B2
(45) Date of Patent: Jan. 29, 2013

(54) APPENDING IDENTIFICATION INFORMATION TO A PRINT JOB BEFORE IT IS TRANSMITTED TO A PRINTING DEVICE

(75) Inventor: Koji Ito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 12/268,965

(22) Filed: Nov. 11, 2008

(65) Prior Publication Data

US 2009/0128847 A1 May 21, 2009

(30) Foreign Application Priority Data

Nov. 15, 2007 (JP) ................................. 2007-297201

(51) Int. Cl.
*G06F 3/12* (2006.01)

(52) U.S. Cl. ..................................................... 358/1.15

(58) Field of Classification Search ................... 358/1.15
See application file for complete search history.

(56) References Cited

U.S. PATENT DOCUMENTS

| 2006/0082816 A1* | 4/2006 | Daniel et al. | 358/1.15 |
| 2006/0087680 A1* | 4/2006 | Maeda | 358/1.15 |
| 2006/0256364 A1* | 11/2006 | Yamamoto | 358/1.14 |

FOREIGN PATENT DOCUMENTS

| JP | 2001-142657 A | 5/2001 |
| JP | 2003-323270 A | 11/2003 |
| JP | 2006-244427 A | 9/2006 |
| JP | 2007-223228A A | 9/2007 |

* cited by examiner

*Primary Examiner* — Benny Q Tieu
*Assistant Examiner* — Eric A Rust
(74) *Attorney, Agent, or Firm* — Canon USA, Inc., IP Division

(57) ABSTRACT

A printing system has a host apparatus including a generating unit that generates print data and an output unit that outputs the print data generated by the generating unit, and a printing apparatus having an input unit that receives the print data output by the output unit and a printing unit that performs printing based on the print data received by the input unit. The printing system can include an appending unit, a storage unit, a selection unit, and a control unit.

14 Claims, 13 Drawing Sheets

APPENDING IDENTIFICATION INFORMATION TO A PRINT JOB BEFORE IT IS TRANSMITTED TO A PRINTING DEVICE

BACKGROUND OF THE INVENTION

1. Field of the Invention

The present invention relates to a printing system, a printing method, a printing apparatus, and a host apparatus for storing print data that has once been used for printing, and reprinting the print data.

2. Description of the Related Art

It typically takes time and effort to repeat collection of "a set of print objects", such as a set of meeting materials created by various applications, a set of favorite photographs, or the like. In a printing apparatus, a function called repeat printing can be utilized in order to collect "a set of print objects" again. In repeat printing, print data that has once been used for printing is stored in, for example, a storage apparatus provided in the printing apparatus, and when the print data is printed again, the print data stored in the storage apparatus or the like is transmitted to a printing engine, which in turn performs printing. This repeat printing has the following advantages:

it may not be necessary to convert an electronic file in a host apparatus into print data when reprinting is performed;

it may not be necessary to browse an image to be printed using an application and perform trimming, correction processing, or the like, with respect to the image again;

it may not be necessary to open an electronic file and set print settings again; and it may be possible to reprint electronic data (e.g., contents on a web when the contents on the web are printed using a web browser) that is an original of print data even when the original data has been erased.

Japanese Patent Laid-Open No. 2001-142657 discloses technology in which a plurality of pieces of print data stored in a printing apparatus are browsed from a host apparatus, the pieces of print data are grouped, and the grouped print data is reprinted, thereby providing "a set of print objects" again.

However, in Japanese Patent Laid-Open No. 2001-142657, the user needs to confirm the contents of print data stored in a printing apparatus and perform editing work for grouping the print data, which may be a large workload. Also, if there are many pieces of print data and these pieces of print data have slightly different print settings, i.e., are similar to each other, it can be difficult to confirm the contents of the pieces of print data and group the pieces of print data.

SUMMARY OF THE INVENTION

Aspects of the present invention relate to a printing system, a printing method, a printing apparatus, and a host apparatus for performing repeat printing on a group-by-group basis while reducing a user's workload.

According to one embodiment of the present invention, there is provided a printing system having a host apparatus including a generating unit that generates print data and an output unit that outputs the print data generated by the generating unit, and a printing apparatus having an input unit that receives the print data output by the output unit and a printing unit that performs printing based on the print data received by the input unit. The printing system includes an appending unit that appends, to the print data generated by the generating unit, identification information that is a unit whereby the print data is managed and is used to identify the print data, the appending unit being included in the host apparatus. The printing system also includes a storage unit that stores the print data to which the identification information is appended by the appending unit, a selection unit that selects any of the identification information of the print data stored in the storage unit, in accordance with an instruction by a user, and a control unit that controls the printing unit so that printing is performed based on the print data to which the identification information selected in accordance with the instruction by the user is appended, the control unit being included in the printing apparatus.

According to another aspect of the present invention, there is provided a printing apparatus that is connected to a host apparatus that generates print data, appends identification information to the print data, and outputs the print data, and has a printing unit that performs printing based on the print data output by the host apparatus, the printing apparatus having a storage unit that stores the print data output by the host apparatus; a selection unit that selects any of the identification information of the print data stored in the storage unit, in accordance with an instruction by a user; and a control unit that controls the printing unit so that printing is performed based on the print data to which the identification information selected in accordance with the instruction by the user is appended.

According to another aspect of the present invention, there is provided a host apparatus that generates and outputs print data to a printing apparatus that performs printing based on the received print data, the host apparatus having an appending unit that appends, to the generated print data, identification information that is a unit whereby the print data is managed and is used to identify the print data.

According to another aspect of the present invention, there is provided a computer-readable storage medium containing computer-executable instructions for controlling a printing apparatus that is connected to a host apparatus that generates print data, appends identification information to the print data, and outputs the print data, the printing apparatus having a printing unit that performs printing based on the print data output by the host apparatus, the computer-readable storage medium having computer-executable instructions for storing the print data output by the host apparatus in a memory; computer-executable instructions for selecting any of the identification information of the print data stored in the memory, in accordance with an instruction by a user; and computer-executable instructions for controlling the printing unit so that printing is performed based on the print data to which the identification information selected in accordance with the instruction by the user is appended.

According to another aspect of the present invention, there is provided a computer-readable storage medium containing computer-executable instructions for controlling a host apparatus that generates and outputs print data to a printing apparatus that performs printing based on the received print data, the computer-readable storage medium having computer-executable instructions for appending, to the generated print data, identification information that is a unit whereby the print data is manages and is used to identify the print data.

Further features of the present invention will become apparent from the following description of exemplary embodiments with reference to the attached drawings.

DESCRIPTION OF THE EMBODIMENTS

Hereinafter, examples of the present invention will be described in detail with reference to the accompanying drawings.

Note that the term "print" as used herein refers to not only a case where information having a meaning, such as characters, graphics or the like, is formed, but also a wide variety of cases where an image, a design, a pattern or the like is formed on a printing medium or a case where a medium is processed to form an image, a design, a pattern or the like, no matter whether it is meaningful. Such information may or may not become manifest so that it can be visually perceived by a human.

The term "printing medium" as used herein refers to not only paper that is used in a general printing apparatus, but also a wide variety of materials that can accept ink, such as cloth, plastic film, metal plate, glass, ceramics, wood, leather and the like.

Figure 1:
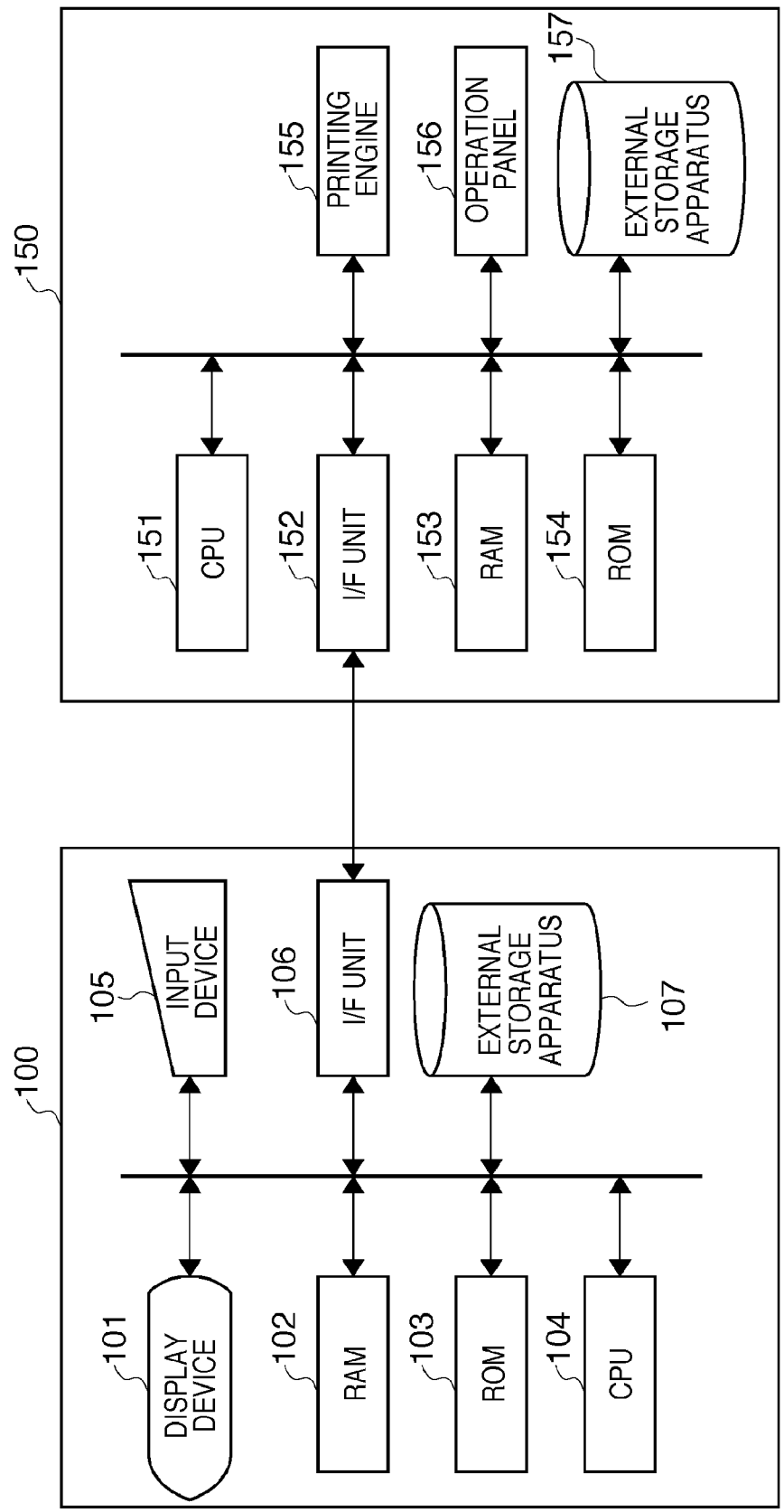
FIG. 1 is a diagram showing an exemplary configuration of a printing system according to the present invention.

FIG. 1 is a diagram showing an exemplary configuration of a printing system according to the present invention. In FIG. 1, the system comprises a host apparatus 100, and a printing apparatus 150 connected thereto, such as an inkjet printer or the like.

In the embodiment as shown, the host apparatus 100 comprises a CPU 104 for executing various processes in accordance with a preset control program, a ROM 103 for storing a program, and a RAM 102 for storing a process result or data. The host apparatus 100 also comprises an input device 105, such as a keyboard, a mouse or the like, a display device 101, such as a display, a liquid crystal monitor or the like, an I/F unit 106, such as a USB or the like, and an external storage apparatus 107, such as an HDD or the like.

The printing apparatus 150 as shown in this embodiment comprises an I/F unit 152, such as a USB or the like, a ROM 154 storing programs for controlling a printing engine 155 and an operation panel 156 of the printing apparatus 150, and a CPU 151 for executing various processes in accordance with these programs. The printing apparatus 150 also comprises a RAM 153 that is used as a work area during execution of a program, and the printing engine 155 for actually performing printing based on print data transmitted from the host apparatus 100. The printing apparatus 150 further comprises an external storage apparatus 157, such as an HDD or the like, for storing print data transmitted from the host apparatus 100, and an operation panel 156 that is operated by the user when repeat printing is performed based on the print data stored in the external storage apparatus 157.

First Embodiment

Figure 2:
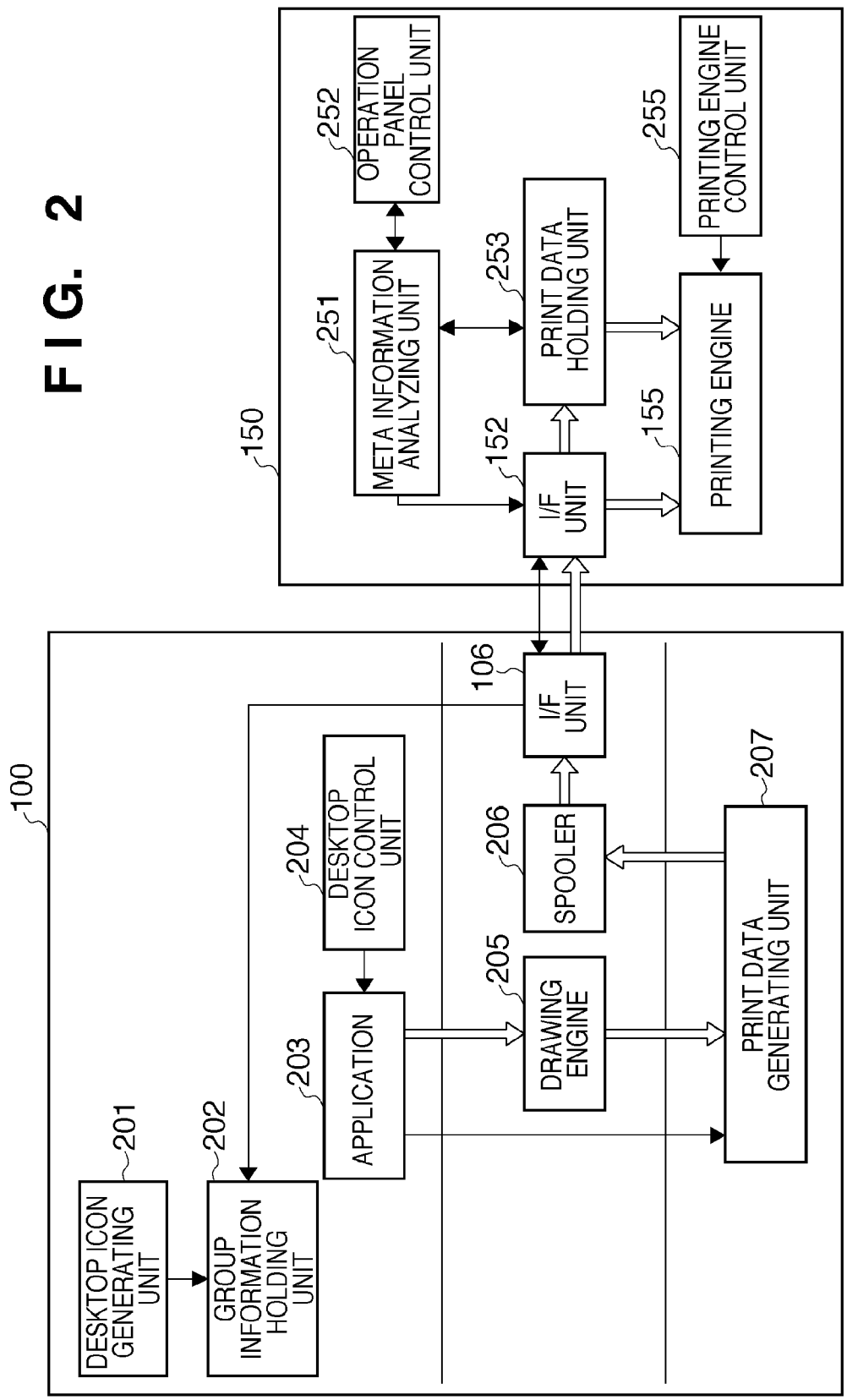
FIG. 2 is a block diagram showing a configuration of a printing system according to a first embodiment.

FIG. 2 is a block diagram showing a configuration of a printing system according to a first embodiment. In FIG. 2, the same parts as those of FIG. 1 are indicated by the same reference numerals. During first or initial printing, the host apparatus 100 generates print data to which group information is appended in accordance with a user's print instruction, and transmits the print data via the I/F units 106 and 152 to the printing apparatus 150. The group information appended to print data is a piece of identification information for identifying the print data, and will be described in detail below. Note that the term "repeat printing" as used herein refers to a printing process in which print data that has once been printed is stored in, for example, a storage apparatus in a printing apparatus, and when printing is performed again, the print data stored in the storage apparatus or the like is transmitted to the printing engine 155 and is then printed. Also, the term "first printing" refers to normal printing, e.g. initial printing, in which a file in a host apparatus is opened using an application or the like and the file is printed from the application.

When print data is transmitted to the printing apparatus 150, printing is performed by the printing engine 155 in the printing apparatus 150, and at the same time, the print data is held by a print data holding unit 253. During repeat printing, print data of a file selected on the operation panel 156 is transmitted to the printing engine 155 and repeat printing is performed.

Hereinafter, each block of FIG. 2 will be described in detail. The host apparatus 100 includes a desktop icon generating unit 201 that is a program for generating a desktop icon that is used when group information is appended to print data. The term "desktop icon" as used herein refers to an icon that allows the user to append group information to print data by a simple operation during first printing. When a file to be printed is dragged and dropped on a desktop icon by a user's operation, print data that corresponds to the file and is to be transmitted to the printing apparatus 150 is generated and, at the same time, group information is appended to the print data. The group information as used herein, when reprinting is performed based on print data stored in the print data holding unit 253 of the printing apparatus 150, is used in order to classify the print data. The group information is also one piece of meta information that is appended as identification information to print data. Note that, in this example, the group information is a unit that manages print data. A piece of group information is appended to one or more pieces of print data.

A group information holding unit 202 holds all pieces of group information of print data stored in the print data holding unit 253 that is a memory in the printing apparatus 150. The group information is used in order to confirm whether or not print data to which the same group information is appended has already been stored in the print data holding unit 253 by referencing the group information holding unit 202 when a desktop icon is created by the desktop icon generating unit 201. Further, the group information holding unit 202 obtains all pieces of group information of print data stored in the print data holding unit 253 of the printing apparatus 150 at the time when the desktop icon generating unit 201 generates a desktop icon. These pieces of group information are analyzed and collected by a meta information analyzing unit 251, and are obtained via the I/F units 152 and 106.

A desktop icon control unit 204 performs a control so that, for example, when the user drags and drops a file to be printed on a desktop icon, an application 203 is activated and the file and group information are transferred to the application 203. Note that this desktop icon is an icon that instructs to start the appending of identification information. By dragging and dropping a file on the desktop icon, appending of meta information as identification information to print data is started.

The application 203 converts a file received from the desktop icon control unit 204 into a drawing command format that can be interpreted by a drawing engine 205 and outputs group information to a print data generating unit 207. Also, in this case, the application 203 simultaneously outputs meta information, such as a date and time when first printing was performed, the name of a file to be printed, and the like, along with the group information to the print data generating unit 207. Note that the date and time when first printing was performed are a date and time when the user dragged and dropped a file to be printed on a desktop icon to output the file to the print data generating unit 207 (i.e., a date and time when print data was generated). The drawing engine 205 converts the drawing command received from the application 203 into bitmap image data and outputs the bitmap image data to the print data generating unit 207.

The print data generating unit 207 performs a color conversion process or a halftone process with respect to the bitmap image data received from the drawing engine 205. Thereafter, the print data generating unit 207 appends a printer control command for outputting at the printing apparatus 150 to the resultant bitmap image data to generate print data and outputs the print data to a spooler 206. Also, in this case, the print data generating unit 207 appends the group information and the meta information, such as a date and time when first printing was performed, the name of a file to be printed, and the like, that have been received from the application 203 to the print data. The spooler 206 receives the print data generated by the print data generating unit 207 and transmits the print data via the I/F units 106 and 152 to the printing apparatus 150.

The meta information analyzing unit 251 analyzes meta information in print data stored in the print data holding unit 253. The meta information analyzing unit 251 also outputs a result of the analysis via the I/F units 152 and 106 to the group information holding unit 202 at the time when the desktop icon generating unit 201 generates a desktop icon. Further, the meta information analyzing unit 251 outputs the analysis result to the operation panel control unit 252 that controls the operation panel 156 at the time when the user selects print data for repeat printing using the operation panel 156.

The operation panel control unit 252 also performs a process of allowing an operation selected by the user using the operation panel 156 to be incorporated into a printing operation. The print data holding unit 253 is used to store print data transmitted by the host apparatus 100. The print data holding unit 253 is ordinarily created in the external storage apparatus 157 of the printing apparatus 150. A printing engine control unit 255 controls an operation of the printing engine 155.

Figure 3A:
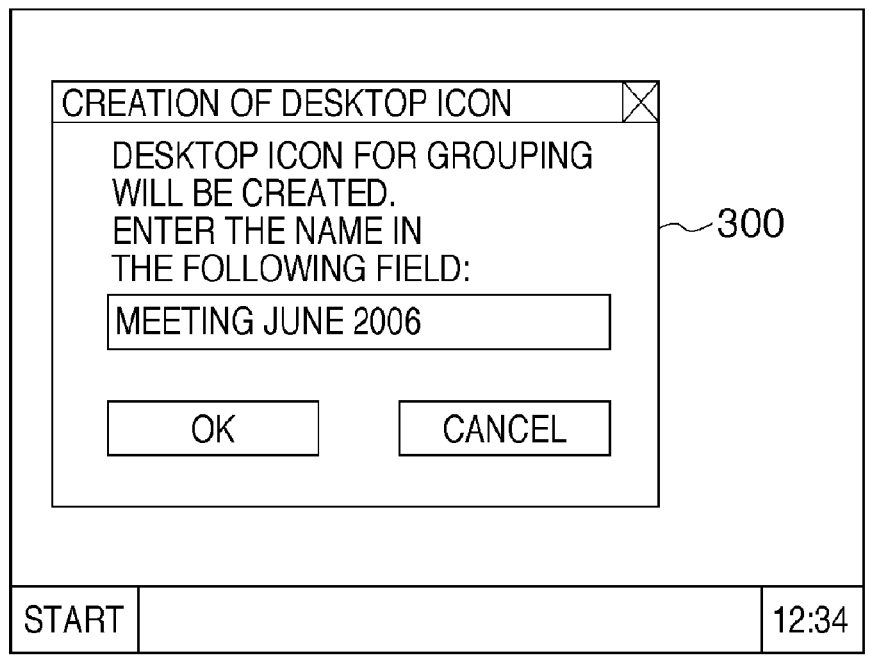
FIGS. 3A to 3C are diagrams for describing examples of operations for creating a desktop icon and appending group information to print data.
Figure 3B:
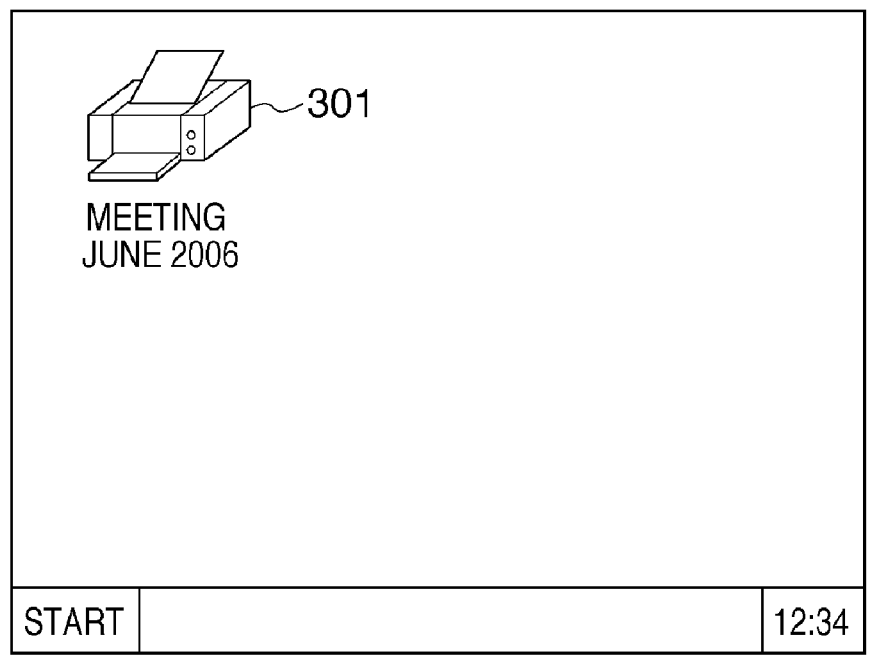
Figure 3C:
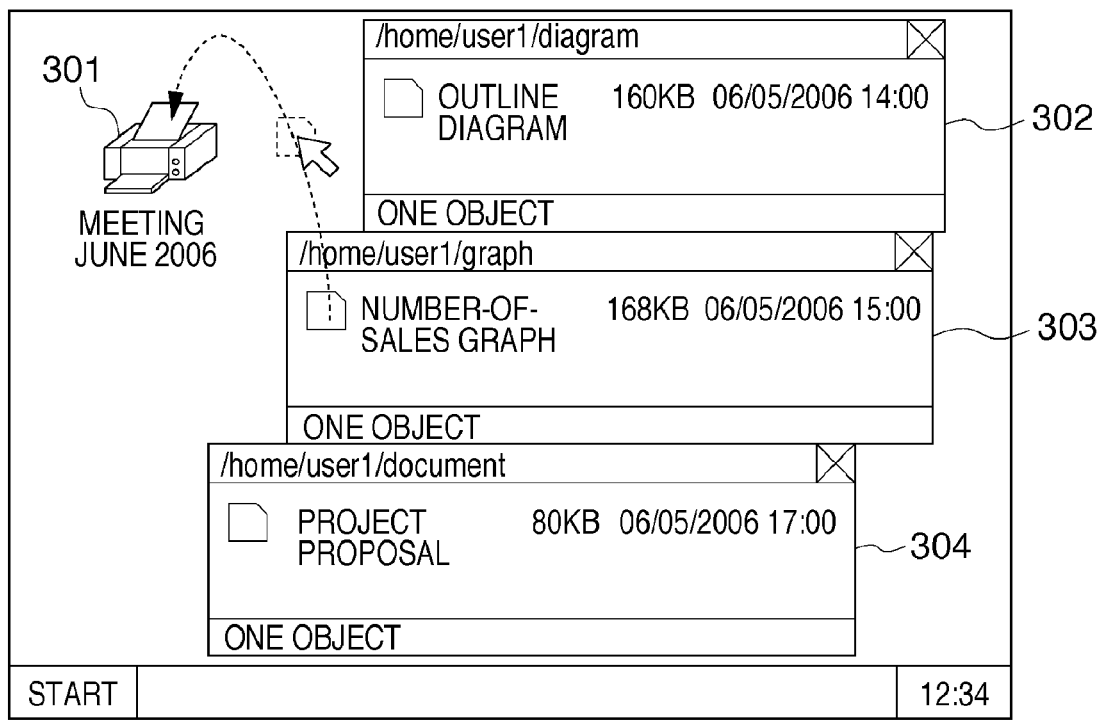

FIGS. 3A to 3C are diagrams showing examples of user operations according to the present invention from creation of a desktop icon to appending of group information to print data using the desktop icon.

Note that it is assumed in the present embodiment that a Graphical User Interface (GUI)-based OS having a window system is installed and operated in the host apparatus 100. The desktop icon generating unit 201 (not shown), when activated by the user, displays a desktop icon creating dialog 300 as shown in FIG. 3A. The user is allowed to enter group information of print data using this dialog. Thereafter, a desktop icon 301 as shown in FIG. 3B is created based on the group information.

In the exemplary desktop icon creating dialog 300 of FIG. 3A, group information of print data is represented by a character string "meeting June 2006". FIG. 3C shows a folder 302 named "/home/user1/diagram" storing a file named "outline diagram", a folder 303 named "/home/user1/graph" storing a file named "number-of-sales graph", and a folder 304 named "/home/user1/document" storing a file named "project proposal". Thus, for example, when the user drags and drops the file "number-of-sales graph" on the desktop icon 301, print data to which the group information "meeting June 2006" is appended is generated in accordance with a flow described below. Thereafter, the print data is stored into the print data holding unit 253 and is printed by the printing engine 155, via the spooler 206 and the I/F units 106 and 152.

Figure 4:
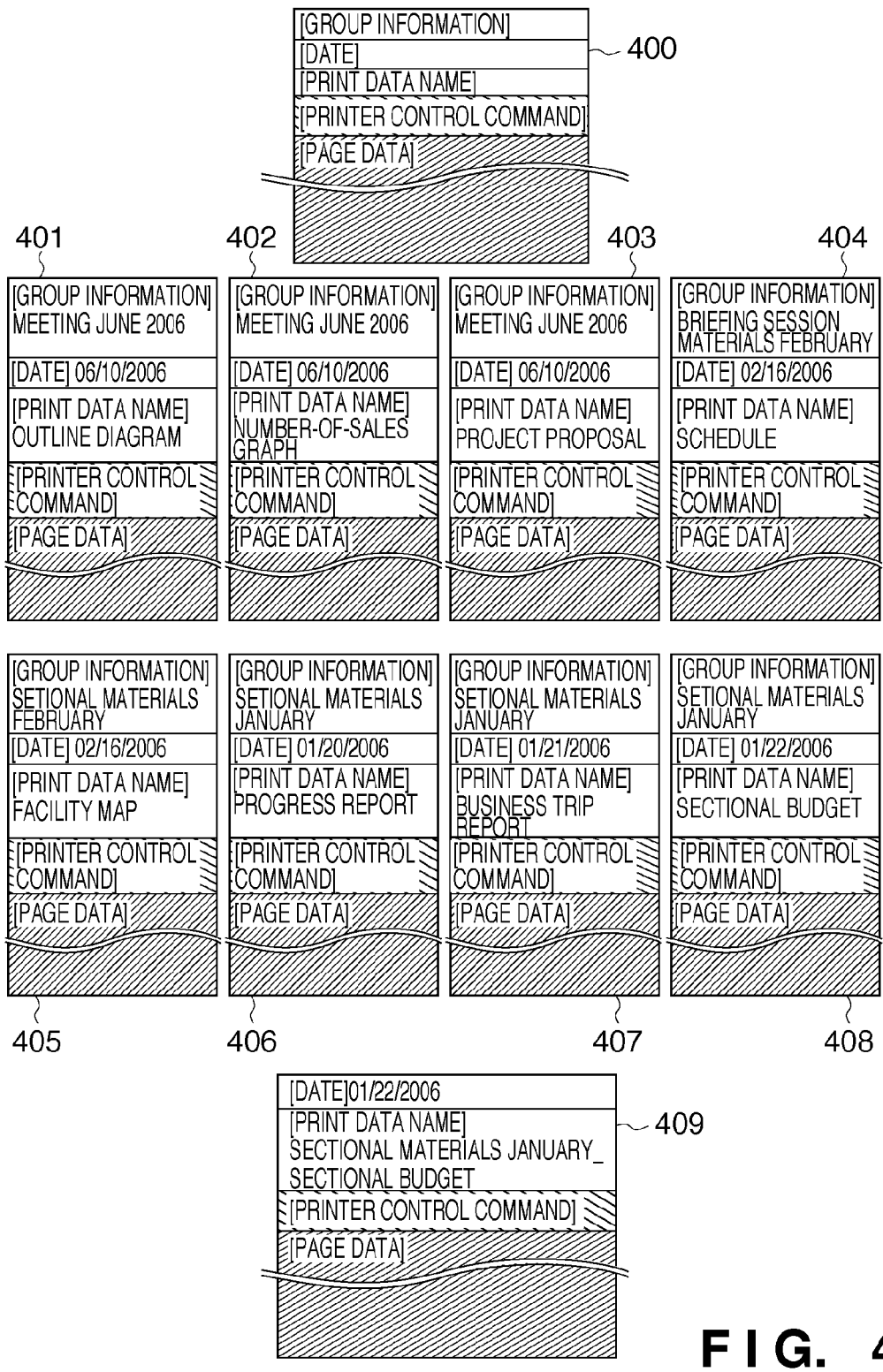
FIG. 4 is a diagram showing an exemplary structure of print data.

FIG. 4 is a diagram showing an exemplary structure of print data output by the print data generating unit 207. Group information entered by the user during generation of a desktop icon is set into "group information" of the print data 400. A date and time when first printing was performed is set into "date" of the print data 400. The name of a file to be printed is set into "print data name" of the print data 400. "Printer control command" indicates a control command that is appended in the print data generating unit 207. "Page data" indicates data that is generated by the print data generating unit 207.

Pieces of print data 401 to 408 indicate print data structures generated from various files. For example, the print data 401 has "outline diagram" as the name of its original file, "06/10/2006" as the date when it was printed, and "meeting June 2006" as group information appended thereto. The print data 408 has "sectional budget" as the name of its original file, "01/22/2006" as the date when it was printed, and "sectional materials January" as group information appended thereto.

In the print data 400, the items "group information" and "print data name" are separately prepared. Alternatively, as shown in print data 409, the print data name item may be set in the form of "group information_print data name".

Figure 5:
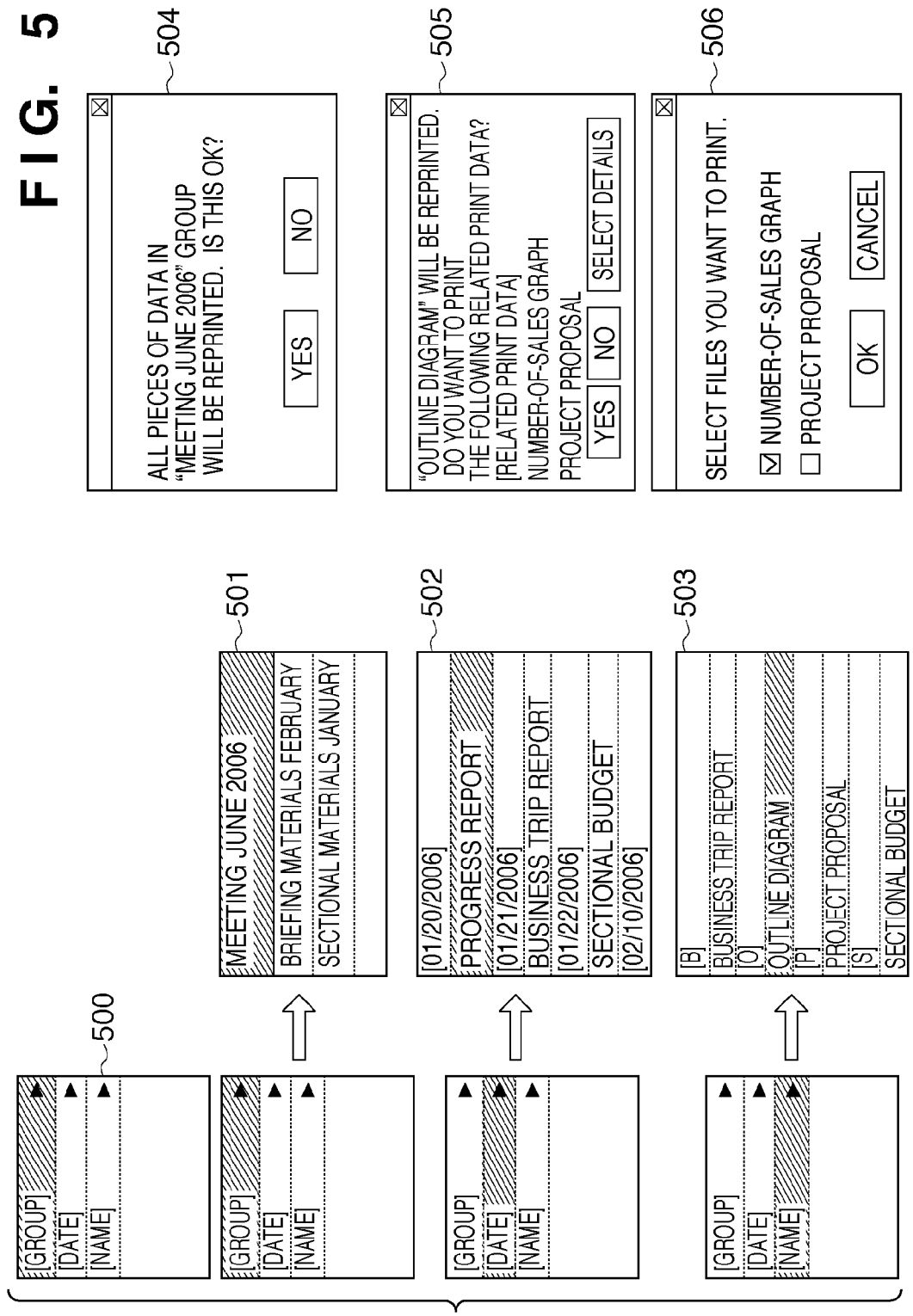
FIG. 5 is a diagram showing examples of screens on an operation panel.

FIG. 5 is a diagram showing examples of screens that are displayed on the operation panel 156 of the printing apparatus 150. Here, the print data 401 to 408 of FIG. 4 are assumed to be stored in the print data holding unit 253. The user selects print data stored in the print data holding unit 253 using the operation panel 156 for the purpose of repeat printing. A first display screen 500 is displayed on the operation panel 156. The user can select print data with respect to which the user wants to perform repeat printing, based on an item, such as "group", "date" or "name". In 500 to 504, an item that is currently selected is displayed in gray. In 500, the item "group" is selected in an initial state. 501 to 503 indicate second display screens. When any item has been selected on the first display screen, if a "Select" button (not shown) is then pressed down, the first display screen is switched to a second display screen. 501 indicates a second display screen when "group" is selected on the first display screen 500 and then the "Select" button is pressed down, where all pieces of group information appended to print data stored in the print data holding unit 253 are displayed. 502 indicates a second display screen when "date" is selected on the first display screen 500 and then the "Select" button is pressed down, where print data is classified according to the date. 503 indicates a second display screen when "name" is selected on the first display screen 500 and then the "Select" button is pressed down, where print data is sorted in order of alphabet. When the user selects group information on the second display screen 501 and then the "Select" button is pressed down, a message indicating "Are you sure you want to execute repeat printing on a group-by-group basis?" is displayed on the dialog 504. Here, if a "Yes" button is pressed down, repeat printing is performed for all pieces of print data to which the group information selected on the second display screen 501 is appended.

Repeat printing on a group-by-group basis can be performed from the second display screens 502 and 503. For example, a case where the print data "outline diagram" is selected on the second display screen 503 will be described. When the user selects the print data "outline diagram" on the second display screen 503, the names ("number-of-sales graph" and "project proposal") of pieces of related print data and a message indicating "Are you sure you want to perform repeat printing with respect to these pieces of print data as well?" are displayed on a dialog 505. The term "related print data" as used herein refers to print data to which the same group information is appended. Here, when the "Yes" button is pressed down, repeat printing is performed with respect to print data "number-of-sales graph" and "project proposal" to which the same group information as that of "outline diagram" is appended. When a "No" button is pressed down, only the print data "outline diagram" is printed. When a "Select details" button is pressed down in the dialog 505, a dialog 506 is displayed. In the dialog 506, the names of pieces of print data to which the same group information as that shown in the dialog 505 is appended are shown along with respective check boxes. Only a piece or pieces of print data with respect to which the user wants to perform repeat printing can be selected by checking the corresponding check box or boxes in the dialog 506. When print data with respect to which the user wants to perform repeat printing is selected and an "OK" button is pressed down in the dialog 506, the dialog 505 is displayed again and only a piece or pieces of print data that have been checked in the dialog 506 are displayed in the "related print data" field. In this case, when the "Yes" button is pressed down in the dialog 505, repeat printing is performed based on the checked print data. When a "Cancel" button is pressed down in the dialog 506, the dialog 505 is displayed again without updating the list of print data displayed in the dialog 505.

Examples of operations in the first embodiment of the present invention will be described with reference to flowcharts shown in FIGS. 6, 7 and 8.

Firstly, an example of an operation where the user creates a desktop icon for appending group information on a display screen of the host apparatus 100, will be described with reference to the flowchart of FIG. 6.

The desktop icon generating unit 201, when activated by the user, displays a desktop icon creating dialog 300 and starts reception of group information input by the user (step S110).

Next, the desktop icon generating unit 201 searches the group information holding unit 202 to determine whether or not the group information input by the user already exists in the group information holding unit 202 (step S120).

When it is determined in step S120 that the group information input by the user already exists in the group information holding unit 202 (YES in step S120), processing proceeds to step S130 where a message "Since the designated group information already exists, please set another piece of group information" is displayed. Thereafter, the process returns to step S110, in which the user is allowed to enter group information again.

When it is determined in step S120 that the group information input by the user does not exist in the group information holding unit 202 (NO in step S120), processing proceeds to step S140, where a desktop icon that is used to append the group information input by the user during first printing is created. Thus, the desktop icon creating process is completed.

Next, an example of an operation of the present invention when the user performs first printing using the desktop icon created on a screen of the host apparatus 100, will be described with reference to the flowchart of FIG. 7.

Figure 6:
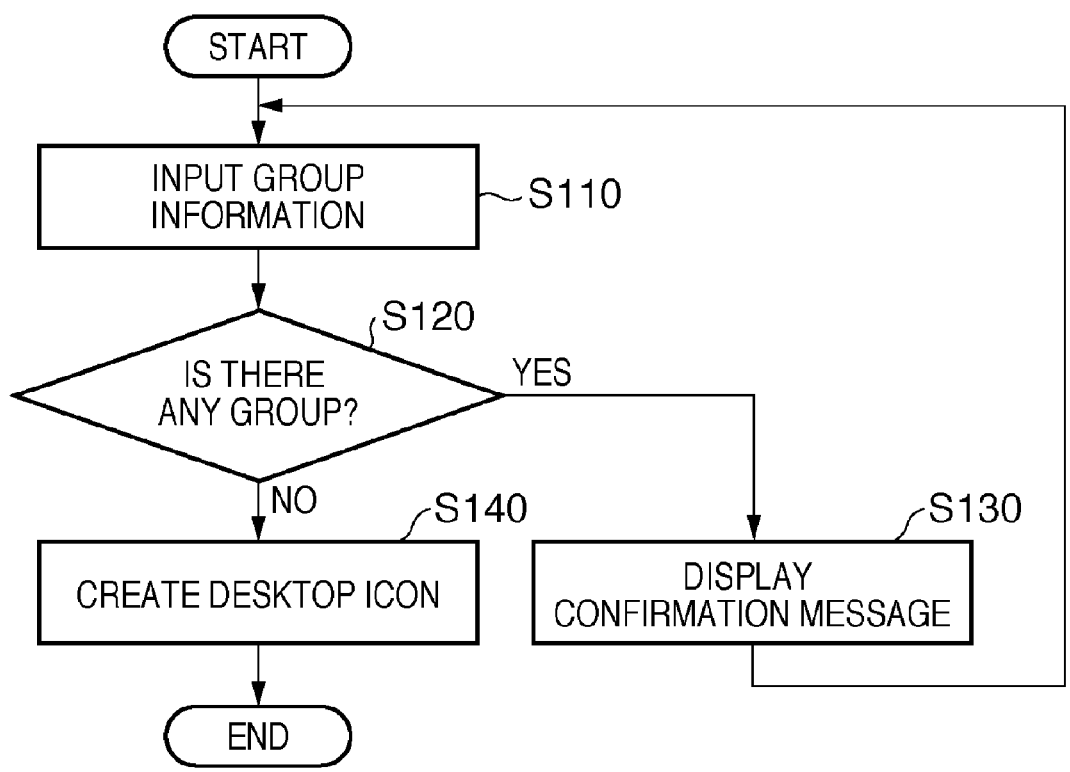
FIG. 6 is a flowchart showing an example of a processing operation of the present invention.

When the user drags and drops a file that the user wants to print on the desktop icon created in step S140 of FIG. 6, the desktop icon control unit 204 activates the application 203 related to this file. Thereafter, this file and the group information that has been set during generation of the desktop icon are transferred to the activated application 203 (step S210).

The application 203 converts the received file into a drawing command format that can be interpreted by the drawing engine 205, and outputs the resultant drawing command to the drawing engine 205. The application 203 also transfers the group information, and meta information, such as a date and time when first printing was performed, the name of the file to be printed, and the like, to the print data generating unit 207. The drawing engine 205 converts the file into bitmap image data based on the drawing command received from the application 203, and outputs the bitmap image data to the print data generating unit 207. Thereafter, the print data generating unit 207 performs a color conversion process or a halftone process with respect to the bitmap image data received from the drawing engine 205, and then, appends thereto a printer control command for outputting at the printing apparatus 150 into a print data format. Further, in this case, the print data generating unit 207 appends the group information received from the application 203 and meta information, such as a date and time when first printing was performed, the name of the file to be printed, and the like, to the print data (step S250).

The print data generating unit 207 outputs the print data generated in step S250 to the spooler 206. The spooler 206 receives the print data generated by the print data generating unit 207 and outputs the print data via the I/F units 106 and 152 to the printing apparatus 150 (step S255).

The print data generated by the host apparatus 100 is received via the I/F units 106 and 152 by the printing apparatus 150 (step S260).

The printing apparatus 150 stores the received print data into the print data holding unit 253 and also outputs the print data to the printing engine 155. The printing engine control unit 255 controls the printing engine 155 so that printing is performed based on the print data (step S265). Thus, the first printing process of the present invention is completed.

It has been described above that, in one embodiment, the printing apparatus 150 stores the received print data into the print data holding unit 253 in step S265. In this case, the received print data may be stored as-is. Alternatively, a folder whose name is group information appended to the print data may be created in the print data holding unit 253, and print data having the same appended group information may be stored in this folder. Moreover, a group information deleting unit may be provided in the host apparatus 100. In this case, the print data holding unit 253 in the printing apparatus 150 may be browsed using the host apparatus 100, and print data stored in the print data holding unit 253 may be able to be deleted.

Figure 7:
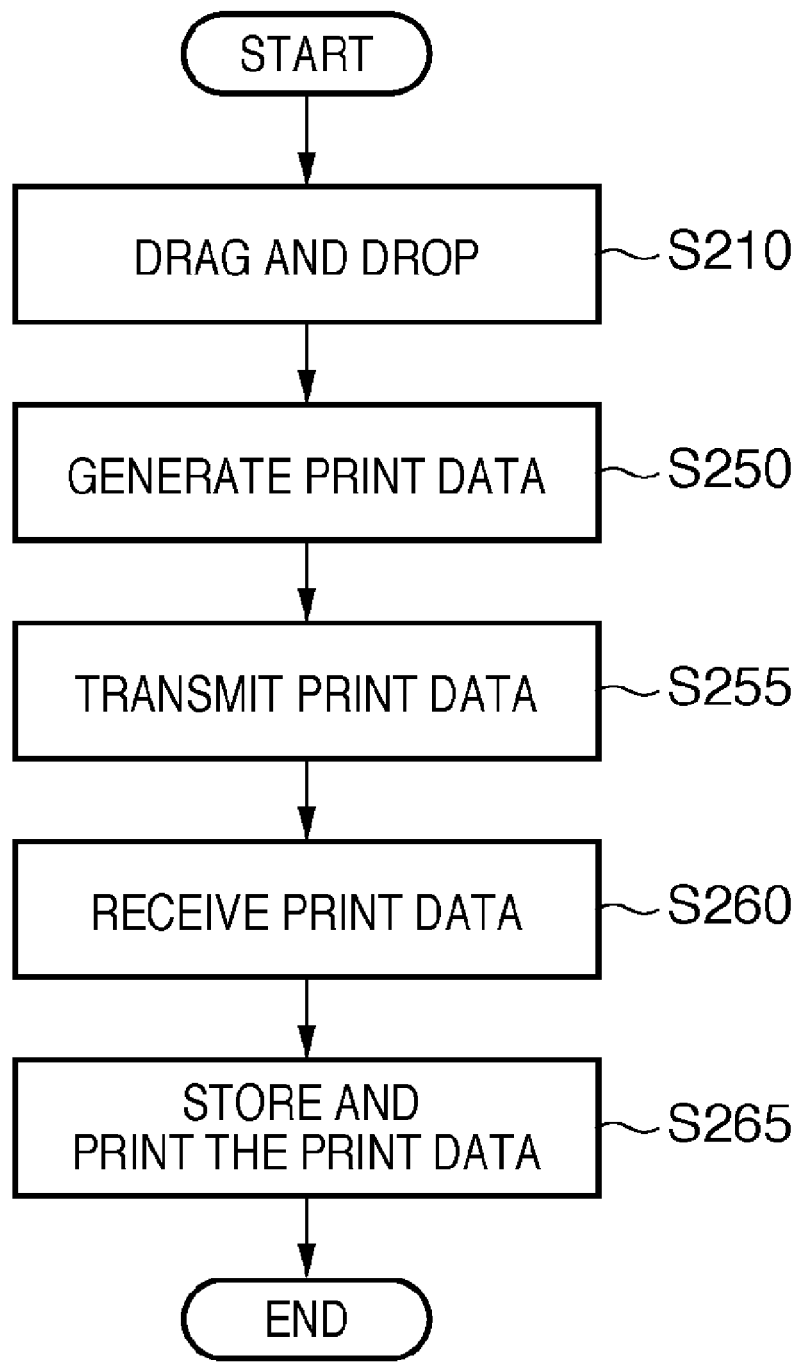
FIG. 7 is a flowchart showing an example of a processing operation of the present invention.
Figure 8:
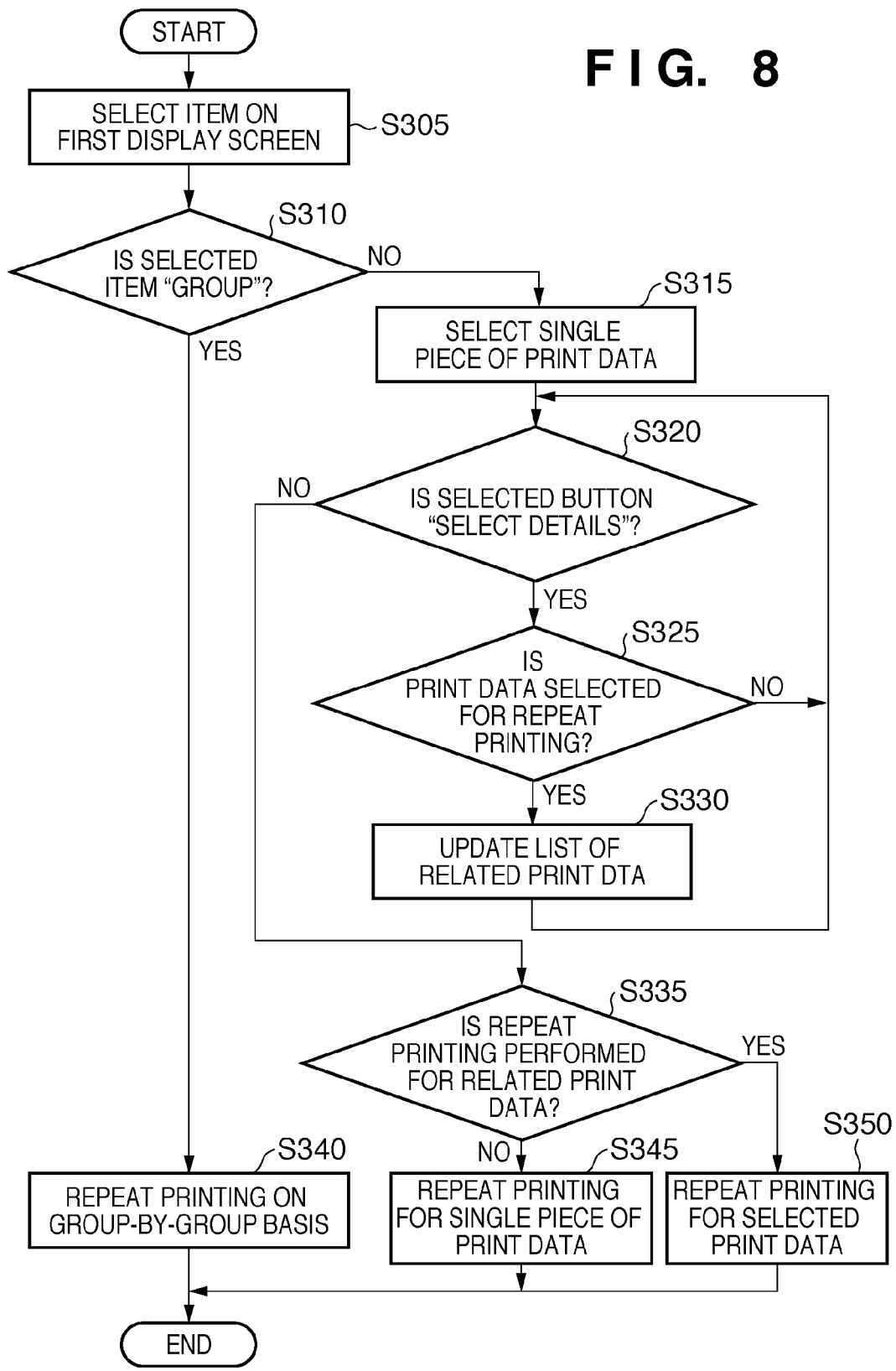
FIG. 8 is a flowchart showing an example of a processing operation of the present invention.

It has been assumed above that, in step S210 of FIG. 7, when a file that the user wants to print is dragged and dropped, the desktop icon control unit 204 transfers this file and the group information set during generation of the desktop icon to the activated application 203. However, when data dragged and dropped on the desktop icon is a folder, the desktop icon control unit 204 may also transfer the name of the folder and the name of a file contained in the folder, as group information, to an application. Thereafter, in step S250, the print data generating unit 207 may append the group information received from the application to print data.

Next, an example of an operation of the present invention when repeat printing is performed based on print data stored in the print data holding unit 253, will be described with reference to the flowchart of FIG. 8.

In this example, the user selects several items displayed on the first display screen 500 using the operation panel 156 provided in the printing apparatus 150, thereby performing repeat printing (step S305). Here, initially, the meta information analyzing unit 251 analyzes the group information and the meta information (e.g., the date, the name, etc.) of the print data stored in the print data holding unit 253, and outputs a result of the analysis to the operation panel control unit 252. The operation panel control unit 252 displays the first display screen 500 on the operation panel 156 based on these pieces of information. The user selects any item of "name", "date" and "group" displayed on the first display screen 500, and presses down the select button (not shown).

When it is determined in step S310 that the item selected by the user is "group" (YES in steps S31), the user selects group information from the second display screen 501, and proceeds to step S340 where repeat printing on a group-by-group basis is performed. The group information selected by the user is transferred to the operation panel control unit 252 and further to the meta information analyzing unit 251. Thereafter, the meta information analyzing unit 251 selects a piece of print data to which the received group information is appended from pieces of print data stored in the print data holding unit 253, and outputs the print data to the printing engine 155. Thus, repeat printing may be performed on a group-by-group basis.

When it is determined in step S310 that the item selected by the user is other than "group" (NO in step S310), i.e., "date" or "name", processing proceeds to step S315 where the user selects a single piece of print data from the second display screen 502 or 503.

When a single piece of print data is selected in step S315, the dialog 505 is displayed. The dialog 505 displays the print data selected in step S315 and a list of pieces of related print data, and also a message asking whether or not to perform repeat printing with respect to these displayed pieces of related print data. Thereafter, the user selects any of "Yes", "No" or "Select details" in the dialog 505 (step S320).

When it is determined in step S320 that "Select details" has been selected (YES in step S320), the dialog 506 is displayed. The dialog 506 displays the names of pieces of related print data to which the same group information as that shown in the dialog 505 are appended, along with respective check boxes. The user checks print data in the dialog 506 with respect to which the user wants to perform repeat printing and presses down the "OK" button (YES in step S325). Processing proceeds to step S330, where the list of related print data to be displayed in the dialog 505 is updated before the process returns to step S320. On the other hand, when the "Cancel" button in the dialog 506 is pressed down in step S325 (NO in step S325), the dialog 506 is switched back to the dialog 505 without updating the list of related print data to be displayed, and processing returns to step S320.

When it is determined in step S320 that "Yes" or "No" displayed in the dialog 505 has been selected (NO in step S320), the process goes to step S335. When it is determined in step S335 that the user has selected "Yes", repeat printing is performed with respect to the single piece of print data selected in step S315 and processing advances to step S350 where the related print data are displayed in the dialog 505 When it is determined in step S335 that the user has selected "No" (NO in steps S335), processing advances to step S345, and repeat printing is performed with respect to only the single piece of print data selected in step S315. Thus, the repeat printing process of the present invention is completed.

Second Embodiment

Hereinafter, a second embodiment will be described. An example of an operation of the present invention has been described in the first embodiment above with reference to the flowchart of FIG. 7, in which first printing is performed by the user using a desktop icon generated on the screen of the host apparatus 100. It has also been described in the first embodiment that the application 203 may directly transfer group information to the print data generating unit 207 in step S250 of FIG. 7. However, during first printing, the desktop icon control unit 204 may also write group information into the group information holding unit 202, and the print data generating unit 207 may also obtain group information from a plurality of pieces of group information held by the group information holding unit 202. This case will be described in the second embodiment. Note that the second embodiment will be described with reference to an example shown in the block diagram of FIG. 9 and the flowchart of FIG. 7.

Figure 9:
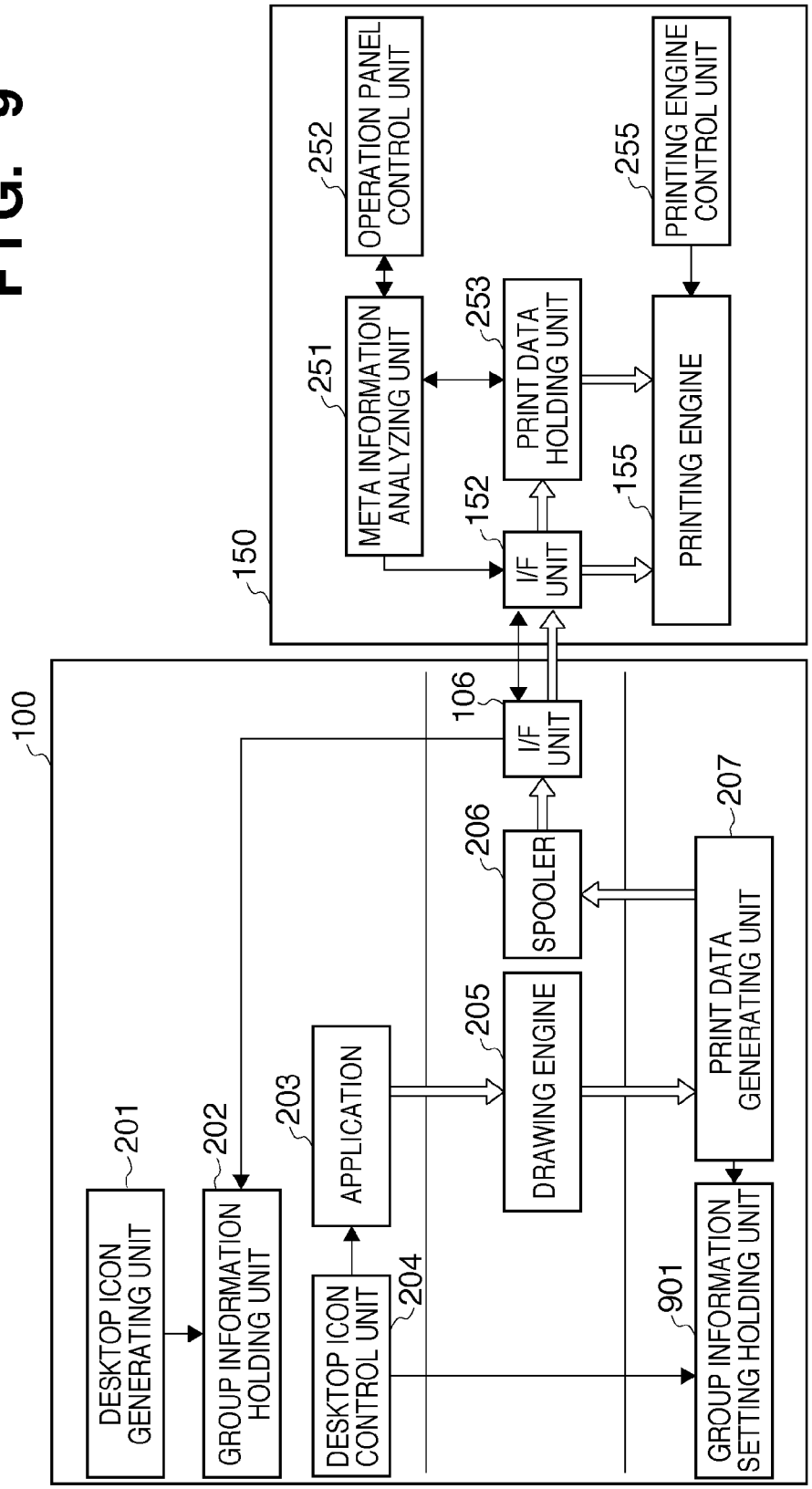
FIG. 9 is a block diagram showing a configuration of a printing system according to a second embodiment.

FIG. 9 is a block diagram showing a configuration of a printing system according to the second embodiment of the present invention. The printing system of FIG. 9 is different from that of FIG. 2 in that a group information setting holding unit 901 is additionally provided. Note that the same parts as those of FIG. 2 are indicated by the same reference numerals.

In the second embodiment, the user initially drags and drops a file that the user wants to print on a desktop icon in step S210 of FIG. 7. In this case, the desktop icon control unit 204 stores group information that has been set during generation of the desktop icon into the group information setting holding unit 901 rather than transferring the group information to an application.

Next, in step S250, the application 203 transfers only a date and time when first printing was performed and the name of the file to be printed to the print data generating unit 207. Also, the print data generating unit 207 receives the date and time when first printing was performed and the name of the file to be printed, of the meta information of print data, from the application 203, and the group information from the group information setting holding unit 901, and appends them to the print data. Step S255 and subsequent steps are similar to those of the first embodiment and will not be described.

Note that when a folder is dragged and dropped on the desktop icon in step S210, the desktop icon control unit 204 stores the name of the folder and the file name of a file contained in the folder, as group information, into the group information setting holding unit 901. Thereafter, in step S250, the print data generating unit 207 may append the group information obtained from the group information setting holding unit 901 to the print data.

It has also been described that, in step S265, the printing apparatus 150 stores the received print data in the print data holding unit 253. As in the first embodiment, the received print data may be stored as-is. Alternatively, a folder whose name is group information appended to the print data may be created in the print data holding unit 253, and print data having the same appended group information may be stored in this folder. Moreover, a group information deleting unit may be provided in the host apparatus 100. In this case, the print data holding unit 253 in the printing apparatus 150 may be browsed using the host apparatus 100, and print data stored in the print data holding unit 253 may be able to be deleted.

Third Embodiment

Hereinafter, a third embodiment will be described. In the first and second embodiments, group information may be appended to print data of a file to be printed by the user creating a desktop icon and dragging and dropping the file to be printed on the desktop icon. However, the name of a folder storing the file to be printed may also be appended as group information to the print data. Alternatively, the user may register and append group information to print data during printing. Such a case will be described in the third embodiment.

Figure 10:
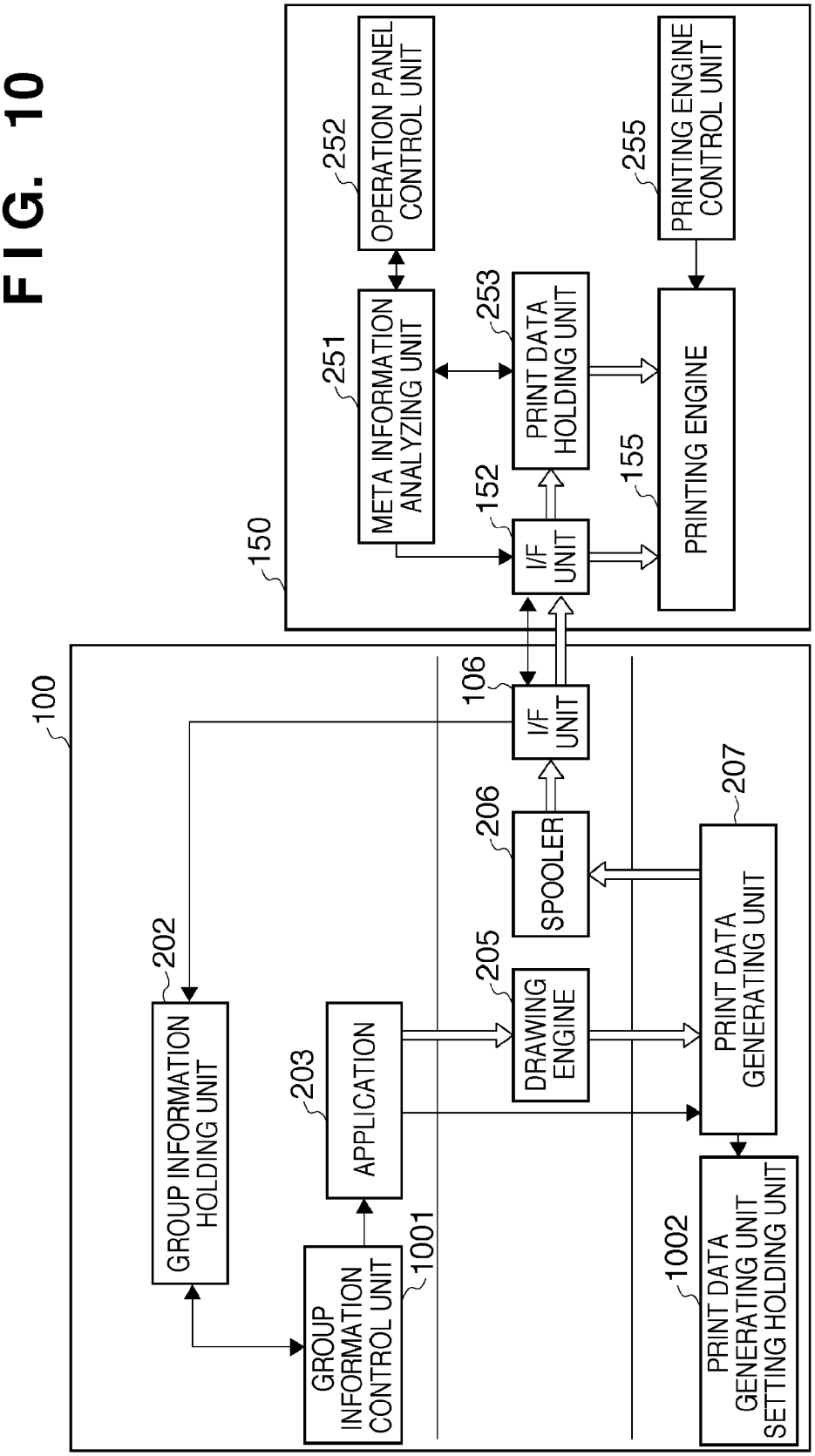
FIG. 10 is a block diagram showing a configuration of a printing system according to a third embodiment.

FIG. 10 is a block diagram showing a configuration of a printing system according to the third embodiment of the present invention. The printing system of FIG. 10 is different from FIG. 2 in that, in FIG. 10, the desktop icon generating unit 201 and the desktop icon control unit 204 are removed and a group information control unit 1001 and a print data generating unit setting holding unit 1002 are added. Note that the same parts as those of FIG. 2 are indicated by the same reference numerals.

In the third embodiment, the name of a folder storing a file to be printed or group information registered by the user can be appended as group information to print data. The print data generating unit setting holding unit 1002 holds a setting indicating whether the name of a folder storing a file to be printed or group information registered by the user is to be appended to print data. The group information registered by the user is also held in the print data generating unit setting holding unit 1002. The setting or the group information registered by the user held in the print data generating unit setting holding unit 1002 is referenced by the print data generating unit 207 during first printing. The group information control unit 1001 is a program for updating the setting of group information appended to print data or group information registered by the user that are stored in the print data generating unit setting holding unit 1002, in accordance with an instruction from the user. The group information control unit 1001 also notifies the application 203 of the setting. The group information control unit 1001 is directly activated by the user and communicates with the group information holding unit 202 at timing of the activation. Thereafter, the group information control unit 1001 obtains group information of print data stored in the print data holding unit 253 of the printing apparatus 150, and causes group information registered by the user not to duplicate each other. The group information control unit 1001 can also be activated from the application 203.

Figure 11A:
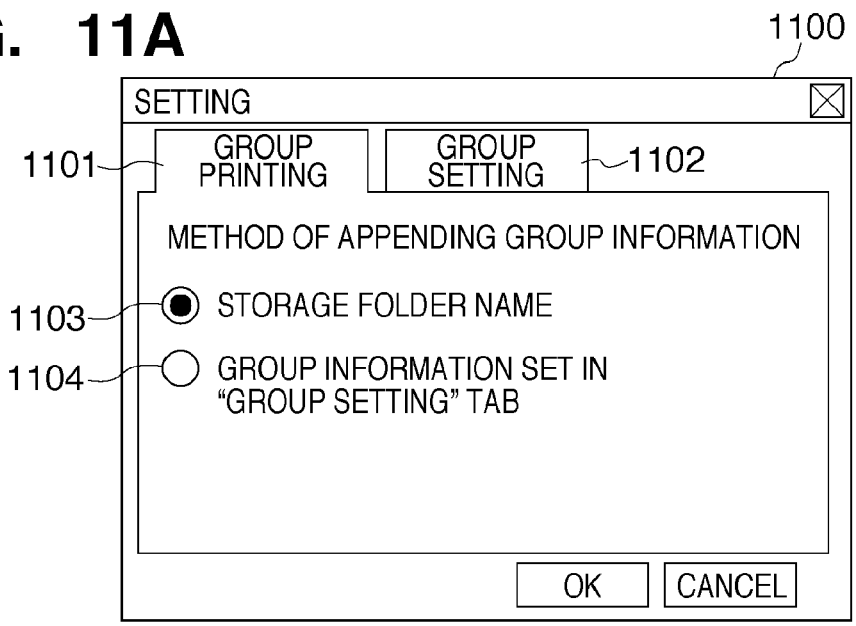
FIGS. 11A to 11C are diagrams for describing examples of setting of group information.
Figure 11B:
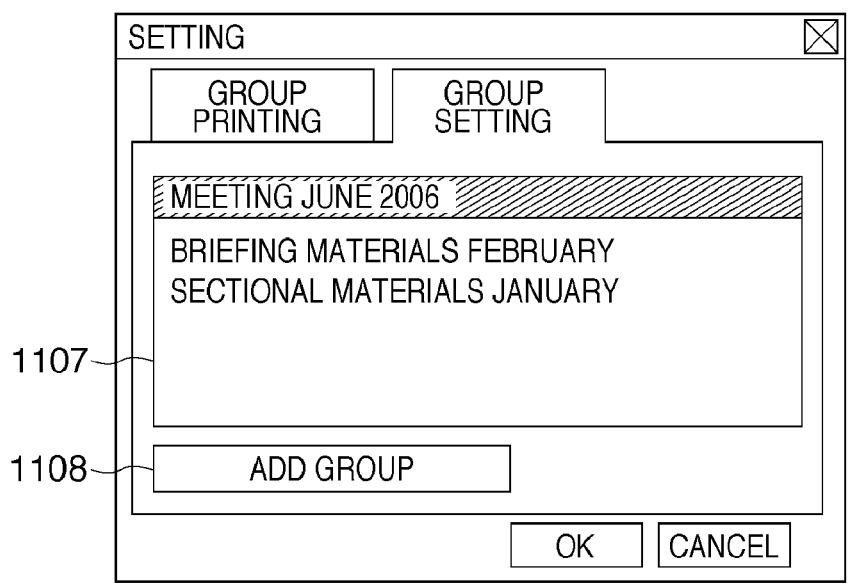
Figure 11C:
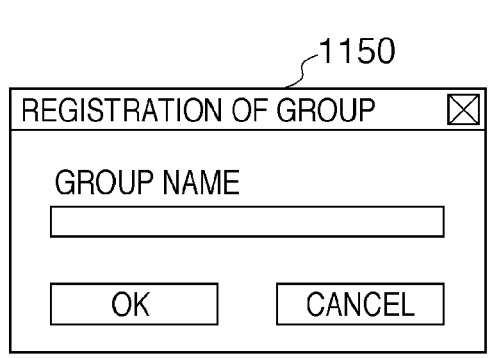

FIGS. 11A to 11C show GUI screens that the group information control unit 1001 display to the user when group information is set. FIG. 11A shows a group information setting dialog 1100 that holds a group printing tab 1101 and a group setting tab 1102. The user selects the type of information to be appended to print data, using the group printing tab 1101. When a radio button 1103 is selected, the name of a folder storing a file to be printed is appended as group information to print data. When a radio button 1104 is selected, group information set in the group setting tab 1102 is appended to print data. The user can register group information using the group setting tab 1102. FIG. 11B shows a registered group display screen 1107 that displays registered group information. Group information to be appended to print data is selected on the registered group display screen 1107. The selected group information is displayed in gray. In FIG. 11B, "meeting June 2006" has been selected as group information. When a group add button 1108 is pressed down, a group information input dialog 1150 is displayed as shown in FIG. 11C. If group information is entered in the group information input dialog 1150, the group information is registered, so that the group information is displayed on the registered group display screen 1107 of FIG. 11B.

Figure 12:
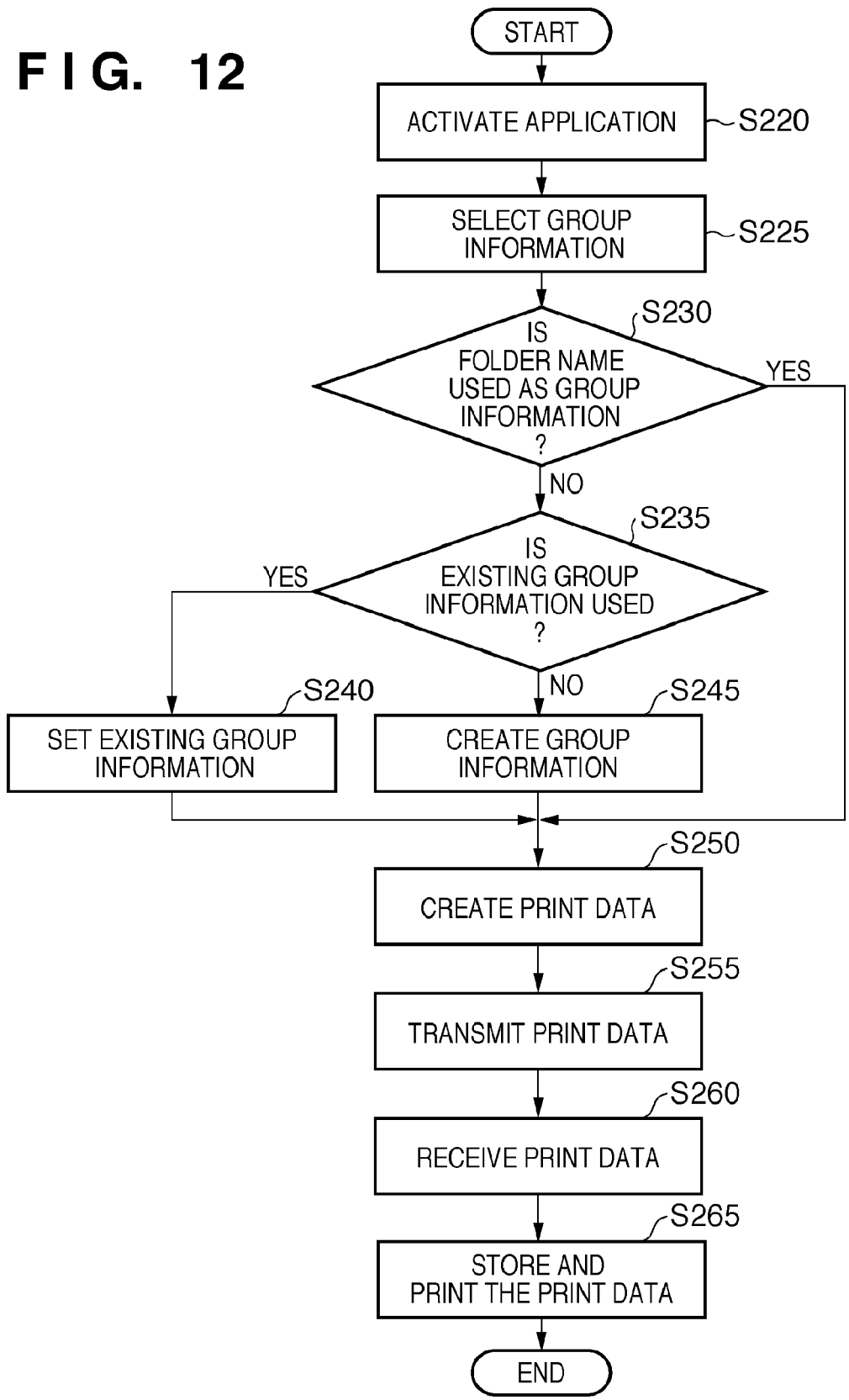
FIG. 12 is a flowchart showing an example of a processing operation of the present invention.

Next, an example of an operation of the third embodiment of the present invention will be described with reference to a flowchart shown in FIG. 12.

Initially, in step S220, the user activates the application 203 and, for example, edits print data using the application 203.

Next, the user selects the type of group information to be appended to the print data (step S225). This selection is performed in the group information setting dialog 1100 that is displayed by a control of the group information control unit 1001 activated by the application 203. Note that, here, an example in which the group information control unit 1001 is activated from the application 203 will be described. Note that the user may directly activate the group information control unit 1001 rather than using the application 203, thereby selecting the type of group information to be appended to print data. Also, in step S225, if the user does not activate the group information control unit 1001 using the application 203, i.e., if the user directly activates the group information control unit 1001, group information may be selected in accordance with previous settings. For example, the name of a folder storing print data may be selected as group information.

Next, in step S230, the type of group information selected in step S225 is determined, and if the type of group information is the name of a folder storing print data (YES in step S230), the process goes to step S250, and if otherwise (NO in step S230), the process goes to step S235.

In step S235, in the group setting tab 1102 of the group information setting dialog 1100, the user newly creates or registers group information, or selects registered group information. The user, when setting registered group information, selects group information registered in the group information setting dialog 1100 (YES in step S235), and processing advances to step S240 where the group information is set. On the other hand, when group information is newly created and set (NO in step S235), processing advances to step S245 where the "group add button" in the group information setting dialog 1100 is pressed down, group information is input to the group information input dialog 1150, and the new group information is registered and selected.

When the user executes printing using the application 203 according to this embodiment, the application 203 converts the edited file into a drawing command format that can be interpreted by the drawing engine 205, and outputs the resultant drawing command to the drawing engine 205. Thereafter, the drawing engine 205 converts the drawing command received from the application 203 into bitmap image data, and outputs the bitmap image data to the print data generating unit 207. Thereafter, the print data generating unit 207 performs a color conversion process or a halftone process with respect to the bitmap image data received from the drawing engine 205, and then, appends thereto a printer control command for outputting at the printing apparatus 150 into a print data format (step S250). In this case, the print data generating unit 207 appends group information and meta information, such as a date and time when first printing was performed, the name of a file to be printed, and the like, to print data. The method of obtaining the meta information varies, depending on the setting held by the print data generating unit setting holding unit 1002. This will be described in detail below.

When the setting held in the print data generating unit setting holding unit 1002 indicates that "the name of a storage folder" is to be appended as group information, the application 203 obtains a storage folder name from a system (e.g., an OS) and transfers the storage folder name as group information to the print data generating unit 207. On the other hand, when the setting held in the print data generating unit setting holding unit 1002 indicates that "group information set in the group setting tab" is to be appended as group information, the print data generating unit 207 obtains group information from the print data generating unit setting holding unit 1002.

Meta information, such as a date and time when first printing was performed, the name of a file to be printed, and the like, other than group information is transferred to the print data generating unit 207 by the application 203.

Thereinafter, processes in steps S255 to S265 are performed in a manner similar to that described above for the first embodiment.

Although it has been described in the first, second, and third embodiments of the present invention that the print data holding unit 253 and the operation panel control unit 252 are provided in the printing apparatus 150, these units may also be provided in the host apparatus 100.

Programs for causing the printing apparatus and the host apparatus to execute the processes described above are also included in the present invention.

Thus, according to one aspect of the present invention, when a file in a host apparatus is opened using an application or the like and normal printing is performed from the application, group information as identification information may be appended to print data without user effort. When repeat printing is performed, group information of print data stored in a memory may be obtained, and the group information can be designated during repeat printing, thereby performing repeat printing on a group-by-group basis. Thus, it is possible to perform repeat printing on a group-by-group basis while reducing user workload.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-297201, filed on Nov. 15, 2007, which is hereby incorporated by reference herein in its entirety.

What is claimed is:

1. A printing system having a host apparatus including a generating unit that generates print data and an output unit that outputs the print data generated by the generating unit, and a printing apparatus having an input unit that receives the print data output by the output unit and a printing unit that performs printing based on the print data received by the input unit, the printing system comprising:
    an appending unit that appends, to the print data generated by the generating unit, identification information that is capable of managing the print data on a print data group-by-print data group basis;
    a storage unit that stores the print data to which the identification information is appended by the appending unit;
    a control unit that controls the printing unit so that printing is performed based on print data selected by a selection unit; and
    the selection unit, wherein the selection unit selects, in accordance with an instruction by a user, any of the print data stored in the storage unit,
    wherein, in response to the instruction by the user being to select a group, the selection unit selects all print data included in the group selected by the instruction by the user and the control unit controls the printing unit so that printing is performed based on all print data included in the group, and
    wherein, in response to the instruction by the user being to select a specific single print data, the selection unit extracts, from the print data stored in the storage unit, related print data having the identification information related to the selected single print data, presents an option to the user to print each related print data as part of printing the selected single piece of print data, and selects, in addition to the selected single print data, related print data to be printed from the extracted print data in accordance with a further instruction by the user based on the option presented to the user.

2. The printing system according to claim 1, wherein the printing apparatus has the storage unit and the selection unit.

3. The printing system according to claim 1, wherein the host apparatus further has a setting unit that sets the identification information to be appended by the appending unit.

4. The printing system according to claim 1, wherein the appending unit appends at least one of a name of a folder storing a file that is an original of the print data when the print data was generated by the generating unit, a date when the print data was generated by the generating unit, and a name of the file, as identification information, to the print data.

5. The printing system according to claim 1,
    wherein the host apparatus further has a display unit that displays an icon of a file that is an original of the print data when the print data was generated by the generating unit,
    wherein the display unit of the host apparatus further displays an icon that instructs to start appending of the identification information, the icon being used by the user so as to start appending of the identification information to the print data by the appending unit, and
    wherein the host apparatus starts appending of the identification information to the print data by the appending unit in response to overlapping of the icon of the file and the icon that instructs to start appending of the identification information by an operation by the user.

6. The printing system according to claim 1, wherein each stored print data includes a piece of group information, a date when first printing was performed, and a print data name, and wherein the selection instructions that select a single piece of print data for printing are based on receiving, in the selection instructions, a date when first printing was performed, or a print data name.

7. A printing method in a printing system having a host apparatus including a generating unit that generates print data and an output unit that outputs the print data generated by the generating unit, and a printing apparatus having an input unit that receives the print data output by the output unit and a printing unit that performs printing based on the print data received by the input unit, the printing method comprising:
    appending, to the print data generated by the generating unit, identification information that is capable of managing the print data on a print data group-by-print data group basis;
    storing the print data to which the identification information is appended by the appending;

controlling the printing unit so that printing is performed based on selected print data; and selecting, in accordance with an instruction by a user, any of the stored print data, wherein, in response to the instruction by the user being to select a group, selecting includes selecting all print data included in the group selected by the instruction by the user and controlling includes controlling the printing unit so that printing is performed based on all print data included in the group, and wherein, in response to the instruction by the user being to select a specific single print data, selecting includes extracting, from the stored print data, related print data having the identification information related to the selected single print data, presenting an option to the user to print each related print data as part of printing the selected single piece of print data, and selecting, in addition to the selected single print data, related print data to be printed from the extracted print data in accordance with a further instruction by the user based on the option presented to the user.

8. A printing apparatus that is connected to a host apparatus that generates print data, appends identification information to the print data, and outputs the print data, and has a printing unit that performs printing based on the print data output by the host apparatus, the printing apparatus comprising:

a storage unit that stores the print data to which the identification information is appended by the appending unit;

a control unit that controls the printing unit so that printing is performed based on print data selected by a selection unit; and the selection unit, wherein the selection unit selects, in accordance with an instruction by a user, any of the print data stored in the storage unit, wherein, in response to the instruction by the user being to select a group, the selection unit selects all print data included in the group selected by the instruction by the user and the control unit controls the printing unit so that printing is performed based on all print data included in the group, and wherein, in response to the instruction by the user being to select a specific single print data, the selection unit extracts, from the print data stored in the storage unit, related print data having the identification information related to the selected single print data, presents an option to the user to print each related print data as part of printing the selected single piece of print data, and selects, in addition to the selected single print data, related print data to be printed from the extracted print data in accordance with a further instruction by the user based on the option presented to the user.

9. A non-transitory computer-readable storage medium containing computer-executable instructions for controlling a printing apparatus that is connected to a host apparatus that generates print data, appends identification information to the print data, and outputs the print data, the printing apparatus having a printing unit that performs printing based on the print data output by the host apparatus, the non-transitory computer-readable storage medium comprising:

computer-executable instructions for storing the print data output by the host apparatus in a memory;

computer-executable instructions for controlling the printing unit so that printing is performed based on selected print data; and computer-executable instructions for selecting, in accordance with an instruction by a user, any of the stored print data, wherein, in response to the instruction by the user being to select a group, the computer-executable instructions for selecting selects all print data included in the group selected by the instruction by the user and computer-executable instructions for controlling controls the printing unit so that printing is performed based on all print data included in the group, and wherein, in response to the instruction by the user being to select a specific single print data, the computer-executable instructions for selecting extracts, from the print data stored in the memory, related print data having the identification information related to the selected single print data, presents an option to the user to print each related print data as part of printing the selected single piece of print data, and selects, in addition to the selected single print data, related print data to be printed from the extracted print data in accordance with a further instruction by the user based on the option presented to the user.

10. A printing system comprising:

a host apparatus having a generating unit configured to begin a process of generating, from a file, a piece of print data configured to be output by a printing unit as a first printing so that the piece of print data has been printed once, and to generate, according to print instructions from a user, a piece of group information for the generated piece of print data, wherein the generating unit is configured to generate a plurality of group information, wherein each group information includes one or a plurality of pieces of group information;

an appending unit configured to receive a piece of group information for a generated piece of print data and append the piece of group information to the generated piece of print data as identification information to classify the piece of print data and create appended print data;

a group information holding unit configured to receive and store each piece of group information that is appended to a piece of print data;

a printing apparatus having a storage unit, the printing unit, and a control unit, wherein the storage unit is configured to receive and store appended print data output from the host apparatus, the printing unit is configured to perform printing based on the appended print data received by the storage unit, and the control unit is configure to control the printing unit to perform printing; and a selection unit configured to receive selection instructions from a user and group together, for printing by the printing unit, a plurality of pieces of print data from the appended print data stored in the storage unit, wherein, in response to receiving selection instructions that select a single piece of print data for printing, the selection unit utilize the single piece of print data to identify the piece of group information associated with that single piece of print data, use that identified piece of group information to identify, from the group information holding unit, each piece of related print data having the piece of group information, and present an option to the user to print each piece of related print data as part of printing the single piece of print data.

11. The printing system according to claim 10, wherein, in response to receiving selection instructions that select a piece of group information for printing, the selection unit utilize the group information stored in the group information holding unit to identify each appended print data having the piece of group information and group them together as a plurality of pieces of print data, and the control unit controls the printing unit to perform printing on the plurality of pieces of print data.

12. The printing system according to claim 10, wherein the generating unit includes a desktop icon configured to generate, in response to a file and the desktop icon being overlapped, a piece of group information for the overlapped file and to transfer the file and generated piece of group information to a file application as part of the process of generating a piece of print data from the file.

13. The printing system according to claim 12, wherein the piece of group information is a function of a character string connected with the desktop icon in response to print instructions from a user.

14. The printing system according to claim 10, wherein each appended print data includes a piece of group information, a date when first printing was performed, and a print data name, and wherein the selection instructions that select a single piece of print data for printing are based on receiving, in the selection instructions, a date when first printing was performed or a print data name.

* * * * *